United States Patent [19]

Johnson et al.

[11] 3,954,911
[45] May 4, 1976

[54] CHLOROBUTYL RUBBER-STYRENE-ACRYLONITRILE GRAFT COPOLYMERS

[75] Inventors: Burnett H. Johnson; Terrence Huff, both of Baytown, Tex.

[73] Assignee: Exxon Research & Engineering Co., Linden, N.J.

[22] Filed: Aug. 15, 1974

[21] Appl. No.: 497,688

[52] U.S. Cl. .............................. 260/879; 260/880 R
[51] Int. Cl.² ............................................ C08L 9/06
[58] Field of Search ...................... 260/880 R, 879

[56] References Cited
UNITED STATES PATENTS

| | | | |
|---|---|---|---|
| 2,857,339 | 10/1958 | Colwell | 260/880 R |
| 3,042,634 | 7/1962 | Mankowich | 260/880 R |
| 3,068,191 | 12/1962 | Seijo | 260/880 R |
| 3,076,779 | 2/1963 | Serniuk | 260/879 |
| 3,085,074 | 4/1963 | Burke | 260/879 |
| 3,144,426 | 8/1964 | Burke | 260/879 |
| 3,284,542 | 11/1966 | Carrock | 260/880 R |
| 3,387,062 | 6/1968 | Thomas | 260/879 |
| 3,461,188 | 8/1969 | Baer | 260/879 |
| 3,562,358 | 2/1971 | Gelman | 260/879 |
| 3,751,524 | 8/1973 | Haigh | 260/880 R |

*Primary Examiner*—Paul R. Michl
*Attorney, Agent, or Firm*—David A. Roth

[57] ABSTRACT

Novel high impact plastics are prepared by the inclusion of 2 to 30 weight percent of chlorobutyl rubber in polymers of styrene and styrene-acrylonitrile and the grafting of said polymers onto said rubber. The graft copolymers are obtained by polymerizing the monomers of styrene or styrene-acrylonitrile in the presence of the chlorobutyl rubber, which is preferably precrosslinked.

13 Claims, 1 Drawing Figure

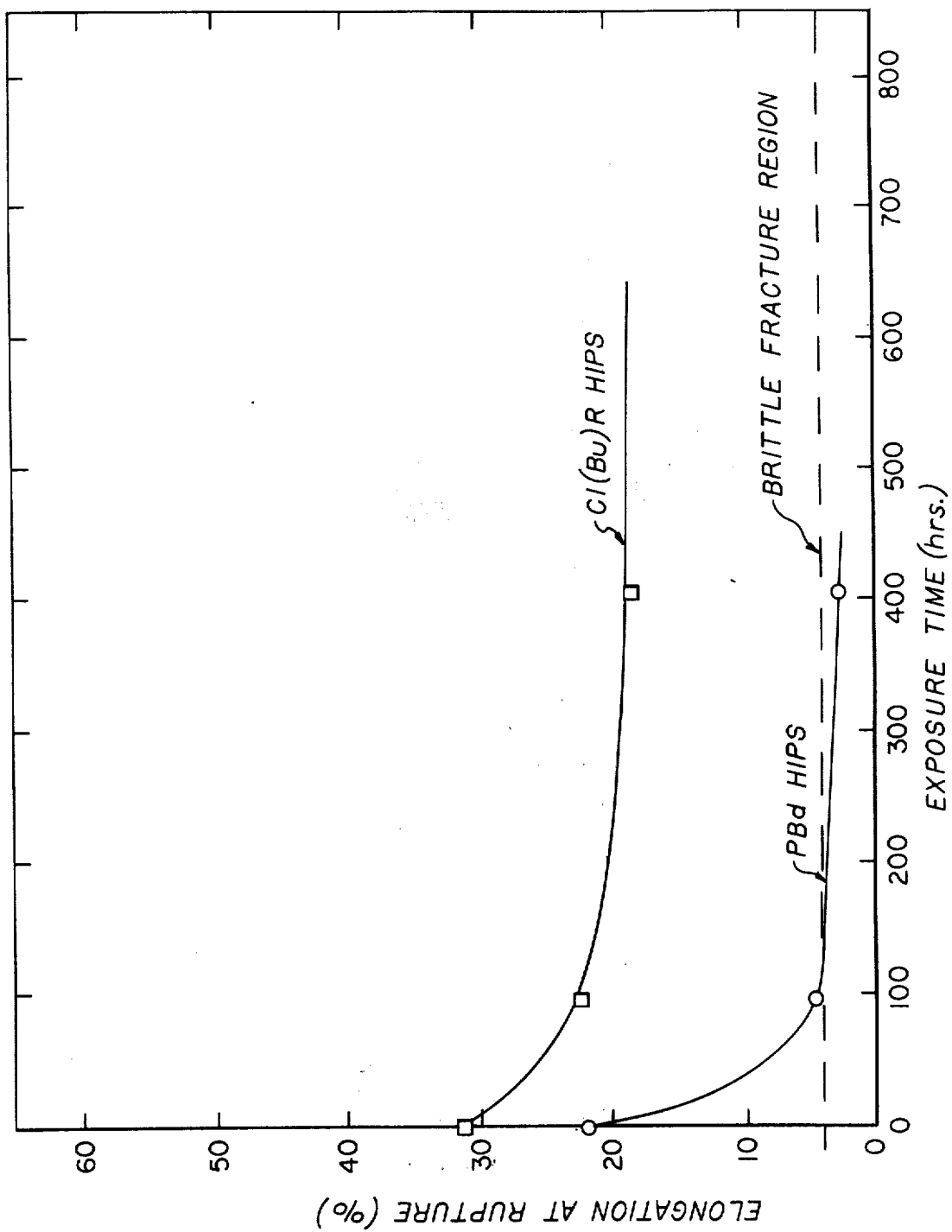

CHLOROBUTYL RUBBER-STYRENE-ACRYLONITRILE GRAFT COPOLYMERS

BACKGROUND OF THE INVENTION

The present invention relates to plastic composite materials, which are polymers having grafted thereon rubbery polymers. The matrix phase polymer, such as polystrene is produced in the presence of the included rubbery phase polymer, thus during this highly excited state the polystyrene is grafted onto the rubbery polymer.

The plastic composite materials have gained wide market acceptance as low cost engineering plastics. These materials exhibit exceptional impact strengths. The plastic composite materials generally are prepared by dissolving a rubber such as polybutadiene or SBR in the polymerization monomer, such as styrene. This mixture is then polymerized by means of thermal or free radical initiation to an intermediate degree of monomer polymerization, e.g., 20–30% conversion. The prepolymer thereby produced is then suspended in an aqueous medium and the polymerization continued to completion in suspension. The resultant graft composite is recovered, washed and extruded.

Although these composite materials are widely used they have exhibited inferior stability to outdoor aging. Various techniques have been tried to improve stability, such as compounding with conventional stabilizers or attempting to select an improved combination of composite materials. In this latter regard, EPR has been substituted for SBR and polybutadiene as the rubber component. It is an advantage of the present invention that a graft copolymer of a thermoplastic material and rubber possessing improved stability has been discovered. It is a particular feature of the present invention that a single continuous copolymerization process as been devised. It is a particular advantage of the present invention that suitable graft copolymers can be produced by several variations of the general process for producing graft copolymers. It is a particular feature of the present invention that the graft copolymers produced have superior weather resistance. A particular feature of the present invention is the omission of a bulk polymerization in one embodiment thereof. These and other advantages and features will become apparent from the following discussion of the invention.

DRAWINGS

The FIGURE is a graph of comparative test data.

SUMMARY OF THE INVENTION

Briefly stated, the present invention is a novel graft copolymer of a thermoplastic matrix of polystyrene or a copolymer of styrene and acrylonitrile and an included phase of chlorobutyl rubber. The present invention also lies in the process of producing the novel graft copolymers. A particular embodiment of this is a method for producing the graft copolymers which comprises imbibing styrene or styrene-acrylonitrile monomer in crosslinked chlorobutyl rubber, dispersing said imbibed rubber in an aqueous suspension, said rubber comprising 2 – 30 weight percent based on the total amount of styrene or styrene-acrylonitrile monomer present in the said suspension, polymerizing said styrene or styrene-acrylonitrile and recovering a graft copolymer of styrene or styrene-acrylonitrile and crosslinked chlorobutyl rubber.

DETAIL DESCRIPTION OF THE INVENTION

In the present novel graft copolymers the backbone of the polymer, i.e., the matrix phase is comprised of polystyrene or a copolymer of styrene and acrylonitrile. The rubbery phase which is included or grafted onto the backbone is chlorobutyl rubber.

Chlorobutyl rubber is a chlorinated butyl rubber. Butyl rubber is a copolymer of small amounts, less than 30% and preferably about 1 to 3% of isoprene and a major proportion isobutylene. The chlorobutyl rubber is produced by reacting the isoprene and isobutylene at low temperatures, −80° to −165° C., in a slurry in an alkyl halide, such as methyl chloride, preferably with a Friedel-Crafts catalyst such as $AlCl_3$. This slurry passes to a flash drum where it is contacted with a hot solvent, e.g., hexane at 0° to 100° C., which solublizes the rubber and drives off the alkyl halide. The product rubber is then chlorinated by introducing a continuous stream of chlorine gas into the hot solvent.

The halogenation is carried out such that the rubber contains about 0.5 weight percent chlorine but not more than 1.0 "X" weight percent chlorine wherein:

$$X = \frac{35.45L}{(100-L)56.10+103.57L} \times 100$$

L = mol percent of isoprene in the polymer. This limitation stated otherwise is to the effect that the rubber should not have a chlorine content exceeding about 1 atom of chlorine per double bond of the rubber. Details on the preparation of chlorobutyl rubber are readily available to those of skill in the art, for example, U.S. Pat. Nos. 2,973,346 and 3,099,644.

Novel graft copolymers according to the present inventions are obtained by commingling the chlorobutyl rubber in the styrene monomer or mixture of styrene monomer and acrylonitrile monomer, which is then polymerized. Only a minor amount, i.e., about 2 to 30 weight percent of the rubber based on polymerizable monomer is added to the monomer to obtain the benefits of the present invention. Preferably about 5 to 8% rubber is dissolved in the monomer prior to polymerization. In addition to the polymerizable monomer, inert solvents for the rubber and resultant graft copolymer may be present such as $C_5$ to $C_{10}$ saturated hydrocarbons, i.e., the conventional rubber solvents, e.g., n-hexane.

When styrene-acrylonitrile polymers are being produced, the polymerizable monomers are generally present in the polymerization in the range of 20 to 90 weight percent styrene and 10 to 80 percent acrylonitrile, preferably about 50 to 80 percent of the polymerizable monomer is styrene. The resulting polymer will contain relative weight percents of monomer constituents in the substantially same ratio as the polymerization.

The process of polymerization of the monomer is carried out under conditions which will abstract the allylic chlorine atoms in the rubber to achieve grafting. This condition is achieved with free radical imitators, such as organic peroxides or hydroperoxides, e.g., benzoyl peroxide, azo or diazo compounds and other well known methods, such as UV or ionizing radiation. The reaction may be carried on in the solvent, however, an emulsion polymerization in an aqueous phase is more conveniently conducted after the formation of a prepolymer (i.e., at about 20-30 conversion of the polymerizable monomer). Although the process is conducted under conditions designed to abstract allylic chlorine, this is only a proposed mechanism and it is not intended to limit the scope of the invention.

The bulk polymerization can be carried out at temperatures in the range of 0° to 250°C., preferably 50° – 150° C. generally at 1 to 50 atmospheres, although subatmosphere pressure or autogenous pressure can be used. Usually an inert atmosphere such as nitrogen will be used.

A suitable process for preparing the present graft copolymers employs a bulk polymerization of a solution of the chlorobutyl rubber in the polymerizable monomer with or without inert solvents. The reaction is carried out as noted above to about 20 to 30% conversion with continuous stirring, at which time the reaction is stopped and the prepolymer dispersed in an aqueous suspension along with the other components from the bulk reaction (i.e., unreacted polymerizable monomer and inert solvent). After about 15% conversion, the polystyrene in styrene solution, e.g., becomes the favored phase and an inversion occurs. A further discussion of inversions of this type may be found in an article by H. Keskkula, et al. appearing in *J. Ap. Poly. Sci.*, 15, 351(1971). Well known bulk polymerization techniques were employed for this procedure as shown in the prior art by G. F. Freeguard and M. Karmarkar, *J. Ap. Poly. Sci.*, 15, 1649(1971); 16, 69(1972).

It has been found that the suspension polymerization is carried out most successfully if the predominately rubber phase is dispersed generally to a particle size of 10 microns or less. The suspension polymerization is generally carried out 50° – 150° C. or preferably 70° – 110° C.

In a particular aspect of the present invention it has been found that the prepolymer preparation can be omitted and the polymerization can be begun and completed in suspension. This unexpected improvement can be achieved by crosslinking the chlorobutyl rubber prior to copolymerizing the polymerizable monomer therewith. The chlorobutyl rubber is conveniently crosslinked by heating a solution of dissolved rubber at a temperature of 100° – 160° C. until an insoluble, crosslinked material is produced. Suitable solvents include hydrocarbons, such as the $C_5 - C_{10}$ hydrocarbons, both reactive and inert such as styrene, hexane, pentane, ethylbenzene, xylene and the like. Generally only the amount of solvent necessary to dissolve the rubber will be employed. The crosslinked chlorobutyl rubber is substantially insoluble in these solvents, however it will imbibe both polymerizable monomers and inert solvents. Alternately crosslinked chlorobutyl rubber can be prepared by heating the solid rubber at temperatures of 100°-200° C. for sufficient time, e.g., up to 24 hours to crosslink the material.

The degree of crosslinking obtained by crosslinking the dissolved chlorobutyl rubber is probably somewhat less than that obtained by crosslinking the solid rubber. When the solvent employed to dissolve the chlorobutyl rubber is a reactant, i.e., styrene, the resultant crosslinked rubber also contains grafted polystyrene. Generally these "master batches" are prepared in a manner similar to the bulk polymerization, but without stirring and for longer times, e.g. up to 90 hours and only small amounts of the polymerizable monomer, styrene or acrylonitrile are present, i.e., sufficient to dissolve the chlorobutyl rubber.

In a preferred process embodiment crosslinked chlorobutyl rubber is obtained by a homogeneous thermally induced curing of chlorobuty rubber, preferably in the absence of any solvent.

The crosslinked chlorobutyl rubber (or chlorobutyl rubber-styrene-acrylonitrile master batch) is substantially insoluble in solvents of the polymerizable monomers. The solvents and monomers are, however, imbibed by the crosslinked rubber (or master batch) causing it to swell to a gel-like mass. The total amount of polymerizable monomer (styrene and styrene-acrylonitrile) is adjusted to provide a chlorobutyl rubber concentration in the range of 2 to 30 weight percent in the final polymerization. The gel is dispersed by any conventional means, such as whipping, grinding, crushing, or the like, provided that a predominate amount of the crosslinked rubber is dispersed to particles of less than 10 microns in size, preferably essentially all of the crosslinked rubber (or master batch) is less than 10 micron size.

The prepolymer from the bulk polymerization, the crosslinked chlorobutyl rubber or master batch of crosslinked chlorobutyl rubber and styrene or styrene-acrylonitrile are polymerized after dispersing the gel in substantially the same manner, i.e., the gel is dispersed to less than 10 micron size and a free radical suspension polymerization carried to completion. The same free radical catalyst may be employed and other conditions and reaction times are substantially the same. The recovered polymers are similar graft copolymers according to the present invention, with the principal difference being the degree of crosslinking of the chlorobutyl rubber. The degree of crosslinking based on the material dispersed in the suspension is crosslinked chlorobutyl rubber> master batch chlorobutyl rubber - styrene or styrene acrylonitrile> prepolymer.

The graft copolymers of the present invention can be characterized as comprising a matrix phase of essentially non-grafted polymer, polystyrene or styrene-acrylonitrile copolymer. Contained in this matrix is a chlorobutyl rubber included phase to which is grafted some matrix phase polymer. The chlorobutyl rubber included phase also contains a substantial proportion of included but non-grafted matrix phase polymer. Generally the total fraction of occluded but non-grafted matrix phase polymer in the chlorobutyl rubber phase is considerably greater than the fraction of matrix phase polymer grafted to the chlorobutyl rubber.

Chlorobutyl rubber shows a relatively high transfer activity in the polymerization of monomer with included chlorobutyl rubber and only moderate retardation of the polymerization rate. The high chain transfer constant of chlorobutyl rubber and the difficulty in separating homopolymer from the copolymer product demonstrates that grafting has occurred.

The following examples demonstrate the present invention and in particular show the many various possible permutations thereof. Although there are numerous detailed examples, they are only illustrative and do not entirely span the scope of the invention herein disclosed. In the examples percents are by weight unless otherwise specified.

Although not recited in the data, particle size of the elastomer phase was frequently determined and is the basis for the range of particle size recited hereinabove. Particle size of the elastomer phase was estimated by pressing a single bead between two glass slides at 200° C. and viewing with a Spencer AO light microscope at 537X magnification. In cases where elastomer phase particles could not be seen, they were assumed to be less than 5µ in diameter.

EXAMPLES 1 – 15

The graft copolymers of the present invention have been prepared by several methods. In these examples, the chlorobutyl rubber was dissolved in the polymerizable monomer and the bulk polymerization carried out to the desired point at which time the prepolymer reaction mixture was suspended in an aqueous system and the reaction continued to completion using the following procedure:

All weights in 100 parts by weight styrene:

1. After bulk polymerization: Add 3 parts styrene containing 0.005 parts lecithin, 0.02 parts Bisphenol A, and 138 parts of suspension system containing water and 0.3 parts GH-20 (high molecular weight polyvinyl alcohol), 0.08 parts KH-17 (low molecular weight polyvinyl alcohol), 2.8 parts Na acetate.
2. Heat additional 2 or 3 hours at 90° C stirring at 300–350 rpm.
3. Add 0.15 parts benzoyl peroxide (wash in with water). Raise temperature to 95°–100° C.
4. Add additional 0.15 parts benzoyl peroxide if beads do not appear to be hardening.
5. Usually leave stirring overnight at 90° C.
6. Filter, wash and dry.

The conditions of the bulk polymerizations, reactants, temperatures, manipulations are given in Table I below. The results from the physical testing are given in Table II. Injection molded samples for mechanical property evaluations were prepared from the beads on a Frohring Minijector using a barrel temperature of about 400° F for polystyrenes and about 500° F for ABS type composites. The mold was maintained at room temperature. Samples were held two days or longer at room temperature prior to testing. Flexural Modulus was ASTM D-790, Procedure A; Tensile, yield and % Elongation, fail were ASTM D-638 (crosshead speed = 2 inches per min.) Izod impact was ASTM D-256, Method C; Melt Flow (MF) was ASTM D-1238, Condition L or P.

TABLE I

BULK POLYMERIZATION

| Example | Styrene gms | Acrylonitrile gms. | HT 1066(1) gms. | Other | Time, hrs. | Temp (deg. C) |
|---|---|---|---|---|---|---|
| 1 | 270 | None | 26 | (0.2 ml DoSH, 0.25 gms Bz$_2$O$_2$ + 0.25 gms at T$_o$ + 4½ hrs.) | 5½ | 90 |
| 2 | 270 | " | 26 | 0.25 gms Bz$_2$O$_2$ | 4½ | 90 |
| 3[6] | 263 | " | 26 | None | 7½ | 122 |
| 4 | 350 | " | 39 | 0.3 ml DoSH | 15 | 122 |
| 5 | 486 | " | 39 | (0.25 ml DoSH, 0.25 gms Bz$_2$O$_2$) (100 ml n-heptane) | 13 | 90 |
| 6 | 486 | " | 39 | (0.25 ml DoSH, 0.25 gms Bz$_2$O$_2$ 20 ml MEK) | (12) (10) | (90) (80) |
| 7[2] | 239 | " | 39 | 75 gms HPS/174 gms Styrene | 8 | 122 |
| 8 | 486 | " | 39 | 35 ml MEK | 16 | 110 |
| 9 | 370 | 108 | 39 | None | 6½ | 100 |
| 10 | 370 | 108 | 39 | 100 ml n-heptane | 6 | 100 |
| 11 | 370 | 108 | 78 | None | 11½ | 100 |
| 12[2,5] | 370 | 108 | 39 | 100 ml n-heptane, 0.3 gms Bz$_2$O$_2$ | 11 | 60 |
| 13[3,7] | 370 | 108 | 85.3 | 100 ml n-heptane | 8 | 100 |
| 14[3,4,8] | 370 | 108 | 39 | 100 ml benzene | 6 | 100 |
| 15[3,4,8] | 370 | 108 | 39 | 100 ml benzene | 6 | 100 |

Abbreviations:
HPS = Homopoly styrene
DoSH = n-dodecyl mercaptan
Bz$_2$O$_2$ = Benzoyl peroxide
MEK = methyl ethyl ketone

[1]Chlorobutyl rubber unsaturation 1.1 to 1.7% chlorine content 1.1 to 1.3%, Exxon Chemical Co., U.S.A.
[2]Particle size adjusted prior to suspension polymerization by Waring blender mixing for 3 minutes
[3]Particle size adjusted prior to suspension polymerization by Waring blender mixing for 5 minutes
[4]1% calcium stearate for stability
[5]2% calcium stearate for stability
[6]Plasticord 5 min. at 170 deg. C 50 RPM after suspension polymerization
[7]23 hours drying in 150 deg. C oven after suspension polymerization
[8]24 hours drying in 150 deg. C oven after suspension polymerization

TABLE II

RESULTS OF TESTING

| Example | Chlorobutyl rubber wt.% | MF$_{230}$(2.16 Kg) | MF$_{190}$(5 Kg) | Tensile Yield (psi) | % Elong. fail | Flex Mod. × 10$^{-3}$ (psi) | Notched Izods (ft lbs/in.Notch) Room Temp. | Notched Izods (ft lbs/in.Notch) −20 deg. F |
|---|---|---|---|---|---|---|---|---|
| 1 | 8.8 | 9.6 | | 5980 | — | 375 | 0.64 | 2.8** |
| 2 | 8.8 | 6.9 | | 5620 | — | 370 | 0.64 | — |
| 3 | 9.0 | 0.49 | | 7218 | — | 370 | 0.65 | 3.4** |
| 4 | 10.0 | 0.96 | | 6520 | — | 343 | 0.72 | 4.8** |
| 5 | 7.4 | 7.1 | | 6630 | 10.9 | 342 | 0.57 | 3.5** |
| 6 | 7.4 | 2.3 | | 8230 | 6.5 | 352 | 0.66 | 3.9** |
| 7 | 7.4 | 4.7 | | 6380 | 5.2 | 373 | 0.42 | 0.28 |
| 8 | 7.4 | 0.79 | | 6940 | 5.0 | 367 | 0.42 | 0.26 |
| 9 | 7.5 | 0.16 | | — | — | 371 | 0.62 | — |
| 10 | 7.5 | 1.1 | | — | — | 370 | 1.68 | 1.30 |

TABLE II-continued

RESULTS OF TESTING

| Example | Chlorobutyl rubber wt.% | MF$_{230}$(2.16 Kg) | MF$_{190}$(5 Kg) | Tensile Yield (psi) | % Elong. fail | Flex Mod. × 10$^{-3}$ (psi) | Notched Izods (ft lbs/in.Notch) Room Temp. | −20 deg. F |
|---|---|---|---|---|---|---|---|---|
| 11 | 14.0 | — | | 3709 | 4.7 | 278 | 0.74 | 0.71 |
| 12 | 7.5 | — | | 5603 | 4.9 | 329 | 0.58 | 0.53 |
| 13 | 15.1 | — | | — | — | 283 | 0.60 | 1.44 |
| 14 | 7.5 | — | | — | — | 351 | 0.74 | 0.55 |
| 15 | 7.5 | — | | — | — | 304 | 0.70 | 0.58 |

**Unnotched

EXAMPLES 16 – 22

In these examples there was no bulk polymerization as such, however, product graft copolymer master batches were prepared as described below in TABLE V, chopped, imbibed, dispersed, etc. as indicated below in TABLE III then subjected to suspension polymerization. The same test procedures as described above were employed and the results are set out below in TABLE IV.

| Example | Other* | Particle Size Adjustment Via |
|---|---|---|
| 16 | 130 gms. chopped copolymer A | Waring blend mix 5 min. |
| 17 | 260 grams chopped A | Waring blend mix 5 min. |
| 18 | 130 gms. chopped B | Waring blend mix 5 min. |
| 19[2,3] | 130 grams chopped C 100 ml n - heptane | Waring blend mix 5 min. |
| 20[1] | 130 gms chopped D 100 ml n - heptane | Waring blend mix 5 min. |
| 21[1,5] | 65 gms chopped E 75 gms HPS/146 gm styrene | Waring blend mix 3 min. |
| 22[4] | 130 gms chopped E 80 ml MEK | None |

*A - E defined in TABLE V
[1]19.5 grams HT 1066
[2]Extruded at 400 deg. F
[3]0.5% calcium stearate for stabilizing
[4]0.3% calcium stearate for stabilizing
[5]18 hours drying in 150 deg. C oven after suspension polymerization.

TABLE IV

RESULTS

| Example | Tensile Yield (psi) | % Elong. fail | Flex Mod. × 10$^{-3}$ (psi) | Notched Izods (ft lbs/in. Notch) Room Temp. | −20 Deg. F |
|---|---|---|---|---|---|
| 16 | 7764 | 7.3 | 344 | 0.69 | 0.31 |
| 17[1] | 6646 | 8.0 | 3200 | 0.95 | 0.77 |
| 18[2,3] | 7034 | 7.8 | 338 | 1.06 | 0.50 |
| 19 | 1724 | 21.7 | 308 | 0.61 | 0.48 |
| 20 | 1503 | 17.7 | 297 | 0.85 | 0.63 |
| 21 | 9523 | 6.3 | 366 | 0.88 | 0.82 |
| 22 | 7723 | 7.6 | 337 | 0.49 | 0.57 |

[1]Later repeat gave RTN Izod of 1.40
[2]Later repeat gave RTN Izod of 1.22, −20 deg. F., − 0.57
[3]MF$_{230}$(2.16Kg) = 0.33

TABLE V

A master batch was prepared by dissolving chlorobutyl rubber in styrene monomer in a 2 liter resin kettle under nitrogen, then placing portions in unstirred bottles in an oven under 4 psig of nitrogen according to formula below.

TABLE V

| RUN | Styrene gms | HT 1066, gms | Heating Schedule Time, hrs | Temp. (Deg. C) |
|---|---|---|---|---|
| A | 461 | 183 | 48 | 100 |
| | | | 78½ | 125 |
| B | 461 | 183 | 48 | 100 |
| | | | 72 | 120 |
| | | | 24 | 150 |
| C | 461 | 183 | 64½ | 100 |
| | | | .48 | 120 |
| D[1] | — | — | 24 | 150 |
| E[2] | 490 | 183 | 24 | 60 |
| | | | 65½ | 80 |

[1]Same as C but continued for additional period of time
[2]1.0 gram benzol peroxide added

EXAMPLES 23 – 31

In examples 23 – 31, precrosslinked chlorobutyl rubber is imbibed and then either subjected to bulk polymerization as described above for Examples 1 – 15 or subjected directly to solution polymerization. The same procedures as described above were employed in the polymerization and preparative process is set out in Table VI and the test results are in TABLE VII. The precrosslinked chlorobutyl rubber was obtained by heating pieces of HT 1066 (1cc or less in average volume) in a vacuum oven at 20 mm Hg, 150° C. for 24 hours (Example 24—18 Hours). The crosslinked rubber was imbibed with styrene or other materials as indicated in TABLE VI.

TABLE VI

BULK POLYMERIZATION

| Example | Styrene, gms | Acrylonitrile, gms | X-L Rubber, gms | Other | Time, hrs | Temp. Deg. C | Particle Size Adjustment Via |
|---|---|---|---|---|---|---|---|
| 23[1] | 370 | 108 | 39 | 100 ml n-heptane | 8¾ | 100 | Waring blend 1 min. |
| 24[1] | 486 | None | 39 | None | (None) | | Waring blend mix 5 min. |
| 25[1] | 370 | 108 | 39 | 100 ml n-heptane | 2 | 100 | Waring blend mix 5 min. |
| 26[2] | 370 | 108 | 56 | 100 ml n-heptane | 2½ | 100 | Waring blend mix 5 min. |
| 27[3] | 370 | 83 | 39 | 100 ml n-heptane | 7½ | 100 | Waring blend mix 5 min. |
| 28[3] | 486 | None | 39 | 100 ml n-heptane | (None) | | as in 31 |
| 29[4] | 515 | None | 41.2 | None | (None) | | Waring blend 1 min. Gear pump 20 min. |
| 30[4] | 515 | None | 41.2 | None | (None) | | Waring blend 1 min. Gear pump 35 min. |
| 31[5] | 486 | None | 39 | None | (None) | | Waring blend 1 min. Silverson mix 5 min. rough shear, 5 min. med. shear, 5 min. high shear. |

[1]0.1% Calcium stearate for stabilization, 24 hours drying of product in 150 deg. C oven
[2]0.3% Ionol 0.3% 2,2' - methylene - bis (4-methyl-6-t-butyl phenol) 0.5% calcium stearate for stabilization.
[3]0.5% Ionol, 0.5% 2,2' - methylene - bis (4-methyl-6-t-butyl phenol) 0.1% calcium stearate for stabilization
[4]0.25% calcium stearate
[5]1.5 × suspension formula given in Example 1 - 15

TABLE VII

TEST RESULTS

| Example | MF$_{100}$(5 Kg) | Tensile Yield (psi) | % Elong. fail | Flex Mod. × 10$^{-3}$ (psi) | Notched Izods (ft. lbs/in.Notch) Room Temp. | −20 Deg.F |
|---|---|---|---|---|---|---|
| 23 | — | — | — | 347 | 0.53 | 0.57 |
| 24 | — | — | — | 320 | 1.31 | 0.57 |
| 25 | — | — | — | 307 | 0.90 | 0.54 |
| 26 | 0.08 | — | — | 312 | 0.98 | 0.56 |
| 27 | 0.10 | 3392 | 7.3 | 264 | 0.95 | 0.41 |
| 28[1] | 3.4 | 2606 | 31.3 | 180 | 2.39 | 0.37 |
| 29 | 0.36 | 6870 | 6.7 | 341 | 0.77 | 0.55 |
| 30 | 0.56 | 5372 | 5.9 | 284 | 1.53 | 0.70 |
| 31 | 0.62 | 5813 | 11.5 | 306 | 0.95 | 0.57 |

[1]Bubbles in impact/stiffness specimens

EXAMPLES 32 – 34

Examples 32 – 34 were carried out as Examples 1 – 15, that is, without crosslinked or prereacted rubber and without a bulk polymerization. The suspension polymerization formulation of Examples 1 – 15 was employed. The reaction procedure is set out in TABLE VIII and the results in TABLE IX.

TABLE VIII

| Example | Styrene gms | Chlorobutyl Rubber gms | Other |
|---|---|---|---|
| 32 | 270 | 21.8 | None |
| 33[1,2] | 370 | 78 | 100 ml n-heptane 75 gms HPS/174 gms styrene |
| 34[1] | 239 | 39 | 10 gms HPS/243 gms styrene |

[1]Imbibed mix of rubber and solvent Waring blend mixed 5 minutes.
[2]After polymerization, copolymer dried 22 hours in 155 Deg. C oven.

TABLE IX

RESULTS OF TESTING

| Example | Chlorobutyl Rubber wt. % | Tensile Yield (psi) | % Elong. fail | Flex Mod. × 10$^{-3}$ (psi) | Notched Izods (ft. lbs/in.Notch) Room Temp. | −20 Deg.F |
|---|---|---|---|---|---|---|
| 32[1] | 7.5 | 6855 | — | 386 | 0.64 | — |
| 33 | 11.2 | 8900 | 8.0 | 369 | 1.15 | 0.79 |
| 34 | 7.3 | 7610 | 6.0 | 361 | 0.52 | 0.63 |

[1]MF$_{gms}$(2.16 Kg) = 4.0, Unnotched Izod at −20 Deg. F. = 3.5

EXAMPLE 35

In this example crosslinking of the chlorobutyl rubber (HT 1066) was aided during bulk polymerization by the addition of 3 ml of hexamethylene diamine thereto. The reaction was carried out for 6 hours at 60° C and for 50½ hrs. thereafter at 90° C. The amount of rubber based on total polymer was 7.4%. The test material showed tensile yield = 5917 psi; percent elongation at failure = 5.2; Flexural modulus × 10⁻³ = 317 psi; Notch Izod Room-temperature = 0.82, −20° F = 0.62.

EXAMPLE 36

In this example the weathering characteristics of a composition according to the invention were compared to a commercial high impact graft copolymer. The invention copolymer employed was that prepared according to Example 28. For comparison a commercial sample of polystyrene — polybutadiene graft copolymer* was employed. Both materials were aged in a Xenon weatherometer and the % elongation at rupture determined at various exposure times. The results are set out in the FIGURE. The loss for the CL (Bu)R HIPS (Ex. 28) was had only 35% loss in percent elongation at 500 hours whereas the commercial product had totally failed. The samples were pulled at 2 inches per minute. Note also that the PBD-HIPS has deteriorated to the brittle fracture region in less than 200 hours of aging.

*Cosden 625 — Cosden Oil & Chemical Co.

A comparison of the included matrix phase polymer contained in the included elastomer phase (chlorobutyl rubber) in the composition of the present invention by the three principal process embodiments described and shown in the examples, is set forth in TABLE X below.

TABLE X

| Example | Chlorobutyl Rubber wt. % | Wt. % Matrix* Phase Polymer in Gel (elastomer phase) | R. T. Notched Izod |
|---|---|---|---|
| 5 | 7.4 | 14.6 | 0.57 |
| 18 | 7.4 | 50.6 | 1.06 |
| 24 | 7.4 | 60.6 | 1.31 |

*Weight % of matrix phase in the residue was determined by shaking ~2 gram samples of the dried beads with 60 ml of 1:1 methyl ethyl keton(MEK)-acetone mixture for ≧ 16 hours. This slurry was then washed with MEK/acetone into two stainless steel centrifuge tubes and centrifuged ten minutes at 11,500 RPM. The residue was dried overnight at 70 deg. C. (15 mm Hg) and reweighted.

The invention we claim is:

1. A graft copolymer comprising as the matrix a polymer of styrene or a copolymer of styrene and acrylonitrile and grafted thereto a crosslinked, chlorinated polymer consisting essentially of isobutylene and 1 to 3 weight percent isoprene and having about one atom of chlorine per double of uncrosslinked polymer, prepared by the process comprising:
   crosslinking a chlorinated polymer consisting essentially of isobutylene and 1 to 3 weight percent isoprene and having about one atom of chlorine per double bond of uncrosslinked polymer,
   imbibing into said crosslinked polymer, styrene or a mixture of styrene and acrylonitrile, containing from about 50 to 80 weight percent styrene, to form a gel,
   dispersing said gel to a particle size wherein the crosslinked chlorinated polymer phase in said graft copolymer is less than 10μ diameter,
   suspending said gel in water,
   polymerizing said styrene or mixture of styrene and acrylonitrile in the presence of a free radical catalyst, at a temperature in the range of 50° to 150° C., said crosslinked, chlorinated polymer being present in an amount of from 2 to 30 weight percent based on total styrene or mixture of styrene and acrylonitrile present in said suspension, and
   recovering a solid graft copolymer of polystyrene or polystyrene-acrylonitrile and included crosslinked chlorinated polymer.

2. The graft copolymer according to claim 1 wherein said graft copolymer is comprised of from 5 to 8 percent of said crosslinked chlorinated polymer.

3. The graft copolymer according to claim 1 wherein said matrix is a polystyrene.

4. The graft copolymer according to claim 1 wherein said matrix is a copolymer of styrene and acrylonitrile.

5. A process of preparing a graft copolymer comprising
   crosslinking a chlorinated polymer consisting essentially of isobutylene and 1 to 3 weight percent isoprene and having about one atom of chlorine per double bond of uncrosslinked polymer,
   imbibing into said crosslinked polymer, styrene, or a mixture of styrene and acrylonitrile to form a gel,
   dispersing said gel to a particle size wherein the crosslinked chlorinated polymer phase in said graft copolymer is less than 10μ diameter,
   suspending said dispersed gel in water,
   polymerizing said styrene or mixture of styrene and acrylonitrile at a temperature in the range of 50° to 150° C, said crosslinked chlorinated polymer being present in an amount of from 2 to 30 weight percent based on total styrene or mixture of styrene and acrylonitrile present in said suspension, and
   recovering a solid graft copolymer of polystyrene or polystyrene-acrylonitrile as the matrix and included crosslinked chlorinated polymer.

6. The process according to claim 5 wherein a mixture of styrene and acrylonitrile containing 50 to 80 weight percent styrene is employed.

7. The process according to claim 5 whereon an inert diluent of $C_5$ to $C_{10}$ saturated hydrocarbon is added to the polymerization.

8. The process according to claim 5 wherein said crosslinked chlorinated polymer is present in the range of 5 to 8 weight percent.

9. The process according to claim 5 wherein said chlorinated polymer is crosslinked by heating solid polymer.

10. The process according to claim 9 wherein styrene is imbibed into said crosslinked chlorinated polymer.

11. The process according to claim 9 wherein said heating is in the range of 100° to 200° C.

12. The process according to claim 10 wherein said suspension polymerization is carried out in the presence of a free radical catalyst.

13. The process according to claim 12 wherein said catalyst is organic peroxide or organic hydroperoxide.

* * * * *